431-168

Search Ro

Nov. 26, 1935.

M. A. POWERS

LIQUID FUEL BURNER IGNITION

Original Filed June 10, 1929

Re. 19,766

Orig. 1,888,692

INVENTOR:
Milton A. Powers
by Carter Carter & Brownley
HIS ATTORNEYS.

Search Room

Reissued Nov. 26, 1935

Re. 19,766

UNITED STATES PATENT OFFICE 19,766

LIQUID FUEL BURNER IGNITION

Milton A. Powers, Detroit, Mich., assignor to The Timken Silent Automatic Company, Detroit, Mich., a corporation of Michigan Original No. 1,888,692, dated November 22, 1932, Serial No. 369,863, June 10, 1929. Application for reissue November 22, 1934, Serial No. 754,376

21 Claims. (Cl. 158—4)

My invention relates to the ignition of liquid fuel burners and is particularly adapted to the ignition of burners of the vertical rotary type in which ignition takes place around the periphery of a refractory hearth member. Heretofore gas pilot lights and the like have been the common means for lighting such burners; but there are a number of objections to this general method, among which are its instability, cost, and limited application.

In some types of oil burners, electric ignition is easily possible as there is some point in the combustion zone where a readily ignitable mixture may always be found and in which a spark gap may be located. On the vertical rotary burner, where combustion takes place at a distance from the rotating head, this condition does not exist. The oil is ordinarily thrown in a finely divided state to the periphery of the refractory combustion surface where it is volatilized, mixes with the accompanying air and burns. The conventional electric spark will frequently ignite this mixture when the refractory is hot but very frequently fails to ignite the mixture when the combustion chamber has completely cooled. A number of methods have been under development and probably the most successful up to the time of my invention consisted of a carborundum pencil located near the refractory ring, which became heated to a yellow heat upon passage of a large current from the usual 110 volt circuit. This high temperature serves to ignite the oil which is vaporized by the heat. However low voltage seriously affects the heating and an additional high voltage circuit with a suitably located spark gap may be added to insure flashing of the vapors. It is evident that these systems are involved and require complicated control systems as the element must be heated before the burner can be started. In addition the current required is often excessive particularly during the starting of the burner motor.

It is very evident that the simplest and best ignition system would be a jump spark properly located if it could be made to function. Such a system is cheap to make and install, requires no special control and is very reliable electrically and may be as universal in its application as the burner itself. Many attempts have been made to utilize a spark gap for ignition at the refractory ring and the results have been most discouraging. The spark between the electrodes is extended by the velocity of the air, and while a very hot spark may be used the heat is not conserved but is dissipated into the air stream. The oil spray passes between or near the electrode and while at times it may be momentarily ignited the high velocity prevents flame propagation and failure results.

The present invention, therefore, has for its principal objects to conserve the heat of the electric spark and to maintain a supply of liquid fuel in proximity to the hot spark, thereby to make the ignition system reliable and dependable even when the combustion chamber has completely cooled. A further object is a simple and durable electric ignition system for such burners. Still further objects and advantages will appear hereinafter.

With the foregoing and other objects in view, the invention consists principally in an electric ignition means in which one electrode is heated, as by electricity; in which a supply of liquid fuel is maintained in close proximity to the heated electrode, in which liquid or vaporized fuel is sprayed onto the heated electrode during the operation of the burner, in which the heated electrode is made considerably larger than the non-heated electrode and in which the heated electrode is made of refractory material or is embedded in refractory material, as in the surface of a refractory hearth member. The invention further consists in the ignition apparatus and in the parts and combinations and arrangements of parts hereinafter described and claimed.

In the accompanying drawing.

Figure 1:
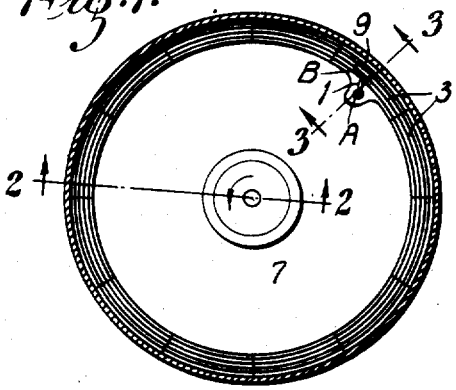
Fig. 1 is a diagrammatic top plan view of an oil burner and an ignition apparatus embodying my invention.
Figure 2:
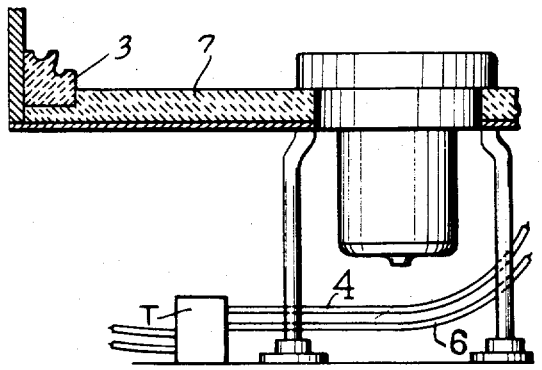
Fig. 2 is a sectional view (on a larger scale) on the line 2—2 of Fig. 1.
Figure 3:
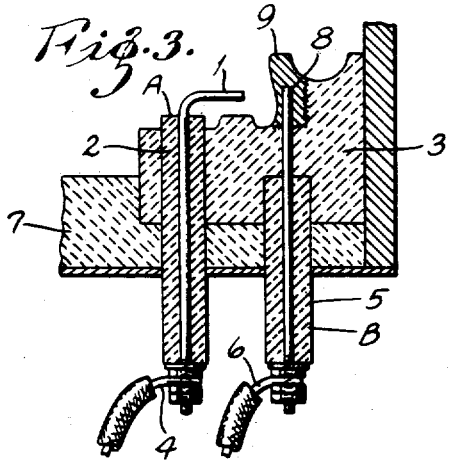
Fig. 3 is a sectional view on the line 3—3 of Fig. 1 showing the ignition apparatus in detail.
Figure 4:
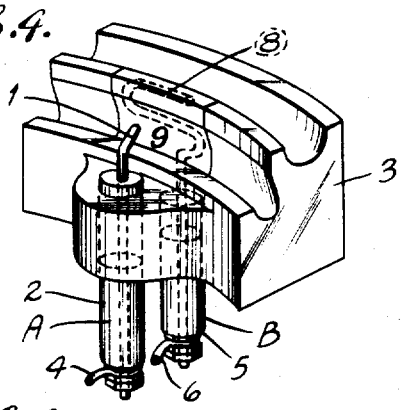
Fig. 4 is a perspective view of the ignition apparatus shown in Fig. 3 and of the refractory hearth member in which it is mounted.

A preferred embodiment of the invention is shown in Fig. 1 in which the conductor wire 1 of one electrode A is mounted in a suitable insulator 2 embedded in one of the refractory members 3 of the peripheral ring of the hearth, said electrode being connected by a wire 4 to a suitable high tension transformer shown at T. In the above type of burner the spray is projected from the rotating burner head along the lines tangent thereto; and, in order to reduce the amount of spray that collects upon the exposed upper end of the conductor wire 1 of the electrode A, said end of said conductor wire is preferably disposed along a line substantially tangent to said burner head. The other electrode B is provided with a suitable insulator 5 embedded in said hearth member 3 and with a wire 6 which also leads to the transformer. Both insulators 2 and 5 extend through the portion of the refractory hearth floor 7 on which said hearth ring 3 is supported. The second electrode B has an elongated conductor wire 8 which is disposed in a block 9 set into the side wall of said refractory hearth member 3 and conforming to the surface thereof. Said block 9 may be made of metal but in the preferred form is composed principally of carborundum or some other material that is refractory and is also a conductor of electricity. Said wire 8 is preferably of serpentine shape, so as to have extended electrical contact with the block and (in the case of carborundum or the like) to reinforce said block.

The transformer may be of any desired type but is preferably of such capacity as to produce a relatively high secondary current. It has been found very satisfactory to have the transformer operate at 10,000 volts and to make the power input to the transformer about 100 watts, which is much greater than the power input heretofore used. This increased power input results in a flaming arc at the spark gap having considerable heating qualities. The impingement of the spark thereon and the passage of the current therethrough causes heating of the carborundum electrode B, greatly aiding in the ignition of the fuel. Liquid fuel accumulates on the surface of the refractory electrode B where the heat of the electrode tends to volatilize the oil while the passage of the flaming arc through the layer of oil to the electrode wire 8 beneath makes ignition certain.

The extent to which the carborundum heats may be controlled not only by regulation of the spark, but also by modifying the composition of the carborundum block 9, as by mixing with the carborundum cement from which the block is made, any desired quantity of some refractory material that is not a conductor of electricity, refractory clay, for example.

Figure 5:
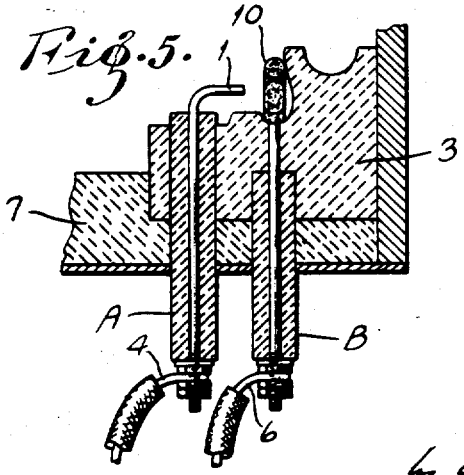
Fig. 5 is a sectional view similar to Fig. 3 showing a modified form of the invention.
Figure 6:
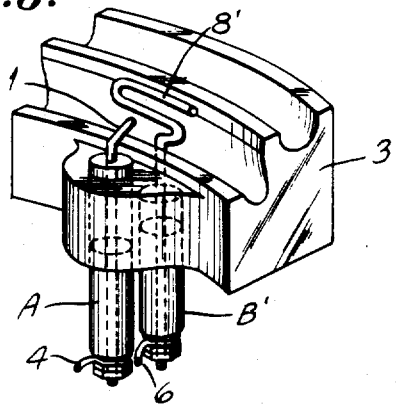
Fig. 6 is a view similar to Fig. 4 showing another modified form.

While the preferred embodiment contemplates the use of an electrode B including a carborundum block 9 set into the surface of the refractory hearth, satisfactory results can also be obtained by mounting one electrode B′ so that its conductor wire 8′ is directly against the surface of the refractory hearth ring 3 and spacing the other electrode A slightly therefrom. Such a modification is shown in Fig. 6. The electrode B′ that is placed against the hearth is preferably considerably larger than the other electrode and is of serpentine shape. Liquid fuel collecting on said electrode B′ and on the hearth in close proximity to the electrode is much more easily ignited than by ignition devices now in use.

Where it is not feasible to modify the hearth construction, as in the preferred embodiment, or to mount one electrode on the surface of the hearth, it is possible to place on one electrode B″ some material as asbestos 10, that will tend to collect liquid fuel. Such a modification is illustrated in Fig. 5. The passage of the spark through this fuel soaked material will facilitate the ignition of said fuel.

The herein described invention has numerous advantages which are evident from the preceding description. The flaming spark and the arrangement whereby one electrode is in close proximity to an accumulation of liquid fuel make the operation of the igniting device quick and certain.

While the above described apparatus and process are particularly adapted for use in connection with vertical rotary oil burners now commonly used for heating houses and other buildings they are also adapted for use in liquid fuel burners generally, no matter for what purpose such liquid fuel burners are used.

As numerous changes may be made in the above construction and different embodiments of the invention made without departing from the scope thereof, it is to be clearly understood that my invention is not limited to these details of construction but is capable of other adaptations and modifications within the scope of the appended claims.

What I claim is:

1. An electric ignitor system for oil burners of the kind having a non-metallic refractory hearth ring, comprising a transformer, a pair of electrodes constituting the ignitor gap of the transformer circuit, both electrodes being supported in fixed relation in a segment of the hearth ring.

2. An electric ignitor system for oil burners of the kind having a refractory hearth ring, comprising a transformer, a pair of electrodes constituting the ignitor gap of the transformer circuit, one of said electrodes being embedded in the surface of said hearth ring and its own surface conforming to the surface of the hearth ring.

3. An igniting device for liquid fuel electric ignition system comprising an electrode of carborundum mixed with insulating refractory material.

4. An igniting device for liquid fuel electric ignition system comprising an electrode of carborundum and refractory clay having an electric conductor wire embedded therein.

5. The improvement in liquid fuel electric ignition devices for burners of the type wherein ignition and combustion take place around the periphery of a hearth member to which fuel is sprayed by a rotary head disposed centrally of the hearth, which comprises a stepped hearth ring, the surface of the lower step being above the level of the hearth floor, said lower step having a continuous groove in its upper surface, and fixed spaced electrode members adjacent to said groove.

6. The improvement in liquid fuel electric ignition devices for burners of the type wherein ignition and combustion take place around the periphery of a hearth member to which fuel is sprayed by a rotary head disposed centrally of the hearth, which comprises a stepped hearth ring, the surface of the lower step being above the level of the hearth floor, said lower step having a continuous groove in its upper surface, and fixed spaced electrode members adjacent to said groove, one of said electrodes being shaped and located to intercept the fuel spray and collect a deposit thereof.

7. An electric ignitor system for oil burners of the kind having a refractory hearth with an upstanding rib around its outer periphery and means for spraying oil toward said peripheral rib, comprising a transformer of at least 100 watts input and having a secondary circuit potential of approximately 10,000 volts and a pair of fixed electrodes constituting the ignitor gap Search Room of the transformer circuit, said electrodes being mounted at the inner face of said rib.

8. An electric ignitor system for oil burners of the kind having a refractory hearth with an upstanding rib around its outer periphery and means for spraying oil toward said peripheral rib, comprising a transformer of at least 100 watts input and having a secondary circuit potential of approximately 10,000 volts and a pair of fixed electrodes constituting the ignitor gap of the transformer circuit, said electrodes being mounted at the inner face of said rib and one of said electrodes being embedded in the surface of said rib.

9. In an igniting device for liquid fuel electric ignition system, an electrode of carborundum and refractory clay having an electric conductor wire embedded therein, said conductor wire being of serpentine shape so as to have extended contact with said carborundum and clay.

10. A liquid fuel electric ignition system of the spark type for burners wherein ignition and combustion take place around the periphery of a hearth member to which fuel is sprayed by a rotary head disposed centrally of the hearth, said system having an input of at least 100 watts and a secondary circuit potential of at least 10,000 volts, and including a pair of fixed spaced electrodes located at the periphery of said hearth, one of said electrodes being of refractory material.

11. A liquid fuel electric ignition system of the spark type for burners wherein ignition and combustion take place around the periphery of a hearth member to which fuel is sprayed by a rotary head disposed centrally of the hearth, said system having an input of at least 100 watts and a secondary circuit potential of at least 10,000 volts, and including a pair of fixed spaced electrodes located at the periphery of said hearth, one of said electrodes being of refractory material having such electrical resistance as to be heated upon passage of the sparking current therethrough.

12. A liquid fuel electric ignition system of the spark type for burners wherein ignition and combustion take place around the periphery of a hearth member to which fuel is sprayed by a rotary head disposed centrally of the hearth, said system having an input of at least 100 watts and a secondary circuit potential of at least 10,000 volts, and including a pair of fixed spaced electrodes located at the periphery of said hearth, one of said electrodes exposing a relatively small surface to the ignitable mixture and the other a relatively large surface to said mixture to intercept and collect a portion thereof, said second electrode being composed of electrical resistance material that becomes heated from impingement of electric spark thereon and passage of current therethrough.

13. A liquid fuel electric ignition system of the spark type for burners wherein ignition and combustion take place around the periphery of a hearth member to which fuel is sprayed by a rotary head disposed centrally of the hearth, said system having an input of at least 100 watts and a secondary circuit potential of at least 10,000 volts, and having a pair of fixed spaced electrodes disposed at the periphery of said hearth.

14. In a liquid fuel burner, a fuel carbureting member providing an impingement wall against which liquid fuel is projected by a rotatable head, means for igniting fuel impinging upon said member comprising electrodes at least one of which is disposed adjacent said impingement wall and in the path of fuel projected from said head, said electrode having an elongated portion disposed substantially tangentially with respect to said head, so as to intercept a minimum of fuel projected therefrom.

15. In an electric ignitor system of the character having a member providing a substantially upright wall against which liquid fuel is projected, an electrode operably associated with said member and having a surface of considerable area disposed substantially flush with said wall and adapted to constitute a part thereof, and a stationary electrode mounted adjacent said first electrode for establishing an electric arc therebetween.

16. The device described in claim 15, wherein said first electrode extends a substantial distance below the region of said wall against which said fuel impinges, for heating and atomizing fuel gravitating downwardly therefrom.

17. The device described in claim 15, wherein said second electrode is supported by an integral portion of said member.

18. In a liquid fuel burner of the character having a rotary head for spraying fuel substantially horizontally, a fuel carbureting member providing an upright wall against which fuel may be sprayed, a second wall cooperating with said first wall and whose upper edge terminates lower than said first wall, said second wall being disposed between said first wall and said rotary head, said walls cooperating to define an upwardly facing groove, and means, comprising a pair of electrodes located adjacent said groove, for producing an electric spark adjacent said impact wall for igniting fuel impinging thereagainst.

19. In a liquid fuel burning apparatus, a hearth, a flame ring assembly disposed around the periphery of said hearth and against which fuel is projected from a head disposed centrally of the hearth, said flame ring assembly comprising a substantially upright wall, and a second substantially upright wall, said second-named wall being higher than, and disposed outwardly of said first named wall, and means for producing an electric arc adjacent said second-named wall for igniting fuel impinging thereagainst.

20. The device described in claim 19, wherein said electric arc producing means extends a substantial distance below the upper edge of said second-named wall, for heating and atomizing the fuel gravitating downwardly thereon.

21. The device described in claim 19, wherein said means is operable to produce an arc located between said walls and below a plane containing the upper edges of the latter.

MILTON A. POWERS.